United States Patent
Cepulis

(10) Patent No.: US 6,874,103 B2
(45) Date of Patent: Mar. 29, 2005

(54) ADAPTER-BASED RECOVERY SERVER OPTION

(75) Inventor: Darren J. Cepulis, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 507 days.

(21) Appl. No.: 10/013,748

(22) Filed: Nov. 13, 2001

(65) Prior Publication Data

US 2003/0093712 A1 May 15, 2003

(51) Int. Cl.$^7$ .................................................. G06F 11/30
(52) U.S. Cl. ........................ 714/13; 714/47; 709/208
(58) Field of Search ................................ 714/2, 11, 13, 714/15, 47; 709/208, 209; 713/1, 2

(56) References Cited

U.S. PATENT DOCUMENTS

| | | | | |
|---|---|---|---|---|
| 5,796,934 A | * | 8/1998 | Bhanot et al. .................. 714/4 |
| 5,852,724 A | * | 12/1998 | Glenn et al. ................. 709/239 |
| 5,881,219 A | * | 3/1999 | Leung et al. .................. 714/31 |
| 6,178,445 B1 | * | 1/2001 | Dawkins et al. ............. 709/209 |
| 6,272,386 B1 | * | 8/2001 | McLaughlin et al. .......... 700/82 |
| 6,314,515 B1 | * | 11/2001 | Miller et al. .................... 713/1 |
| 6,542,924 B1 | * | 4/2003 | Abe ............................ 709/208 |
| 6,564,336 B1 | * | 5/2003 | Majkowski ..................... 714/4 |
| 2001/0056554 A1 | * | 12/2001 | Chrabaszcz ................... 714/13 |
| 2002/0083366 A1 | * | 6/2002 | Ohran ........................... 714/13 |
| 2002/0120706 A1 | * | 8/2002 | Murphy ....................... 709/208 |
| 2002/0133735 A1 | * | 9/2002 | McKean et al. ................ 714/5 |

* cited by examiner

*Primary Examiner*—Scott Baderman
*Assistant Examiner*—Anne L. Damiano

(57) ABSTRACT

A system includes a plurality of inter-connected servers coupled to a storage device. The servers are programmed so that one server functions as a primary and another server(s) functions as a backup slave server. When the slave detects that the primary has failed, the slave performs a number of actions to take over run-time operation for the primary. Each server includes a mass storage device controller and executable code that permits the slave to detect the primary's failure and take over for the primary. Such code is included in the mass storage device controller, not in the system ROM as in conventional systems. Because the system ROM is not burdened with code that is specific to the mass storage device controller, the system ROM need not be upgraded and reflashed each time a new mass storage device controller is inserted into the slave computer.

16 Claims, 2 Drawing Sheets

ADAPTER-BASED RECOVERY SERVER OPTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a system of inter-connected computers implementing redundant computer option in which one computer is backup to another computer and automatically becomes active upon failure of the other computer. More particularly, the invention relates to embedding executable code in a mass storage device controller in a server computer to permit a backup server to detect the failure of a primary server and boot up to take over the function of the failed primary server.

2. Background of the Invention

Server computers can be coupled together into a larger system in a variety of configurations. One such configuration includes a pair of server computers in which one server functions as a primary server and the other server is a backup (or "slave") server. This configuration is shown in FIG. 1. Two servers 52a and 52b are shown having a shared connection to a storage array 56. Server 52a may function as the primary server, while server 52b is the slave. Each server includes a mass storage device controller 58a and 58b which provides an interface to the storage array 56. The controllers 58 typically comprise circuit cards which care inserted into the servers. As such, the controller cards can easily be replaced as, for example, upgraded cards become available. Each server also includes a system read only memory ("ROM") 60a, 60b which contains code executed by a central processing unit ("CPU") (not specifically shown). Further still, the servers are interconnected by an asynchronous communication port 54 which permits the slave server to detect when the primary has failed. One of ordinary skill in the art will recognize that many other components are provided in the servers.

When the servers 52a, 52b are powered on, the primary server 52a performs its power on self test ("POST") (the process that runs from the time power is applied until boot up) and then completes the boot process to begin run-time execution. The slave server 52b generally performs its POST, but does not complete the boot process. Instead, as explained below the slave server monitors the communication port 54 to determine whether the primary server has failed. When the primary fails, the slave completes the boot process and takes over run-time execution.

The communication port 54 is used by the slave to detect when the primary has failed. The primary server 52a sends a "heartbeat" signal over the communication port 54 to the slave server 52b in accordance with a predetermined protocol and at a predetermined period (e.g., once per minute). The slave server 52b polls the communication port 54 for the heartbeat signals. If the primary server 52a fails to send a heartbeat signal, the slave server 52b will detect the lack of receipt of the heartbeat, determine that the primary server has failed and respond accordingly. The slave's response entails a number of activities including configuring the connection with the storage array 56 and completing the boot process.

The code that the slave server 52b runs to cause it to stall during the initialization process, detect whether the primary server has failed and complete the boot process is generally part of the slave's system ROM 60b. That code is specifically shown in FIG. 1 as the redundant server option ("RSO") code 62b. This configuration, in which the system ROM contains the RSO code, has several deficiencies. For instance, the RSO code communicates with the controller card 58b and accordingly is specific to that particular controller. Because there are a variety of different controllers 58b currently available, the system ROMs must include RSO code that can communicate with any such controller complicating the system ROM code. Further, if a new controller 58b becomes available, new system ROM code must be developed and tested to include RSO support for the new controller(s). This requires significant development effort, time and cost. Also, it requires the operator of the server to "reflash" the system ROM in every server in which new controllers are installed to update the system ROM code. Many companies have numerous servers (e.g., hundreds) and reflashing every system ROM can be a very labor intensive, time consuming, and thus undesirable effort. Thus, developing a new mass storage device controller, therefore, causes new system ROM code to be developed and deployed to support the new controller in a server configuration which includes a standby, redundant server.

A redundant server configuration is needed which has little or no impact on system ROM code when new mass storage device controllers are introduced into the marketplace. Despite the advantages such a system would provide, no such system is known to exist to date.

BRIEF SUMMARY OF THE INVENTION

The problems noted above are solved by a system including a plurality of inter-connected computers (e.g., servers) coupled to a storage device. The servers are programmed so that one server functions as a primary and another server(s) functions as a backup slave server. When the slave detects that the primary has failed, the slave performs a number of actions to take over runtime operation for the primary. Each server includes a mass storage device controller. In accordance with the preferred embodiment, the executable code in the slave server that permits the slave to detect the primary's failure and take over for the primary is included as part of the mass storage device controller in the slave, not in the slave's system ROM as in conventional systems. Because the system ROM is not burdened with code specific to the mass storage device, the system ROM need not be upgraded and re-flashed each time a new mass storage device controller is inserted into the slave computer. This and other features and benefits will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a given component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device "couples" to a second device, that connection may be through a direct electrical connection, or through an indirect electrical connection via other devices and connections. In addition, no distinction is made between a "processor," "microprocessor," "microcontroller," or "central processing unit" ("CPU") for purposes of this disclosure. To the extent that any term is not specially defined in this specification, the intent is that the term is to be given its plain and ordinary meaning.

DETAILED DESCRIPTION OF THE PREFERRED EMBODIMENTS

Broadly speaking, the problems noted above are solved by including code to support the redundant server option functionality described above in a mass storage device controller, rather than in system ROM. Thus, the system ROM need not be upgraded each time a new mass storage device controller becomes available in the marketplace and the operator of the server equipment need not spend time and money reflashing the system ROMs. Although the following embodiment is described in the context of server computers, the principles discussed herein should not be limited to the server context and, unless otherwise limited, can be extended to other types of computers or computer-related devices and equipment.

Figure 1:
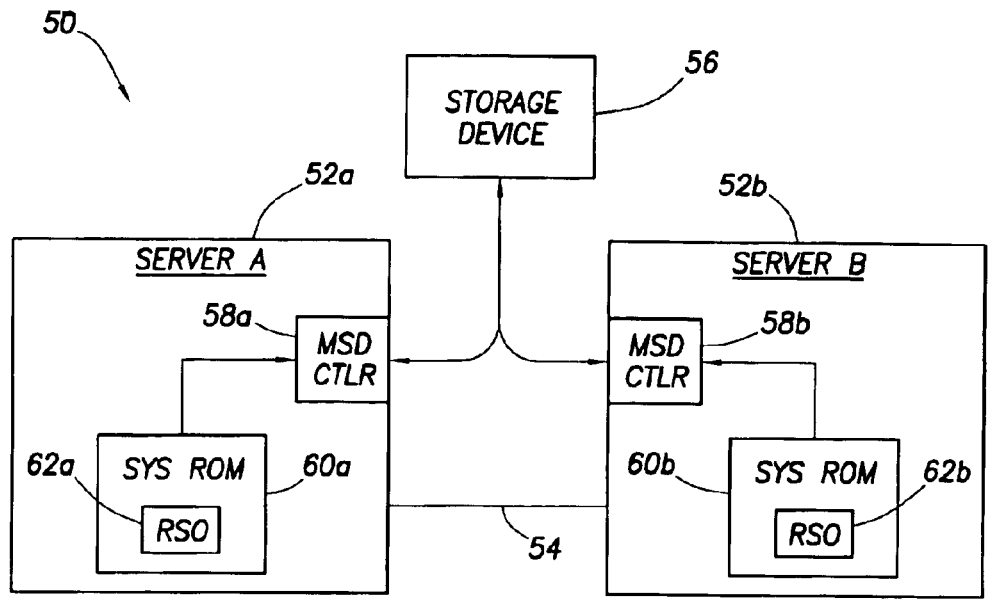
FIG. 1 depicts a prior art redundant server option configuration in which redundant server option code is part of the system ROM.
Figure 2:
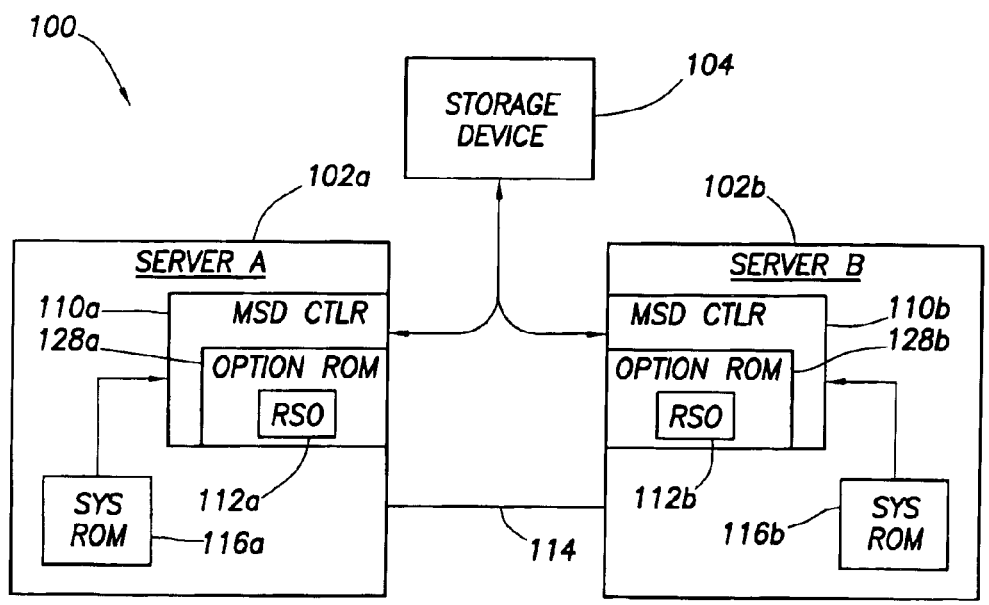
FIG. 2 depicts a server configuration in accordance with the preferred embodiment in which the redundant server option code is part of the option ROM included in the mass storage device controller rather than the server's system ROM.
Figure 3:
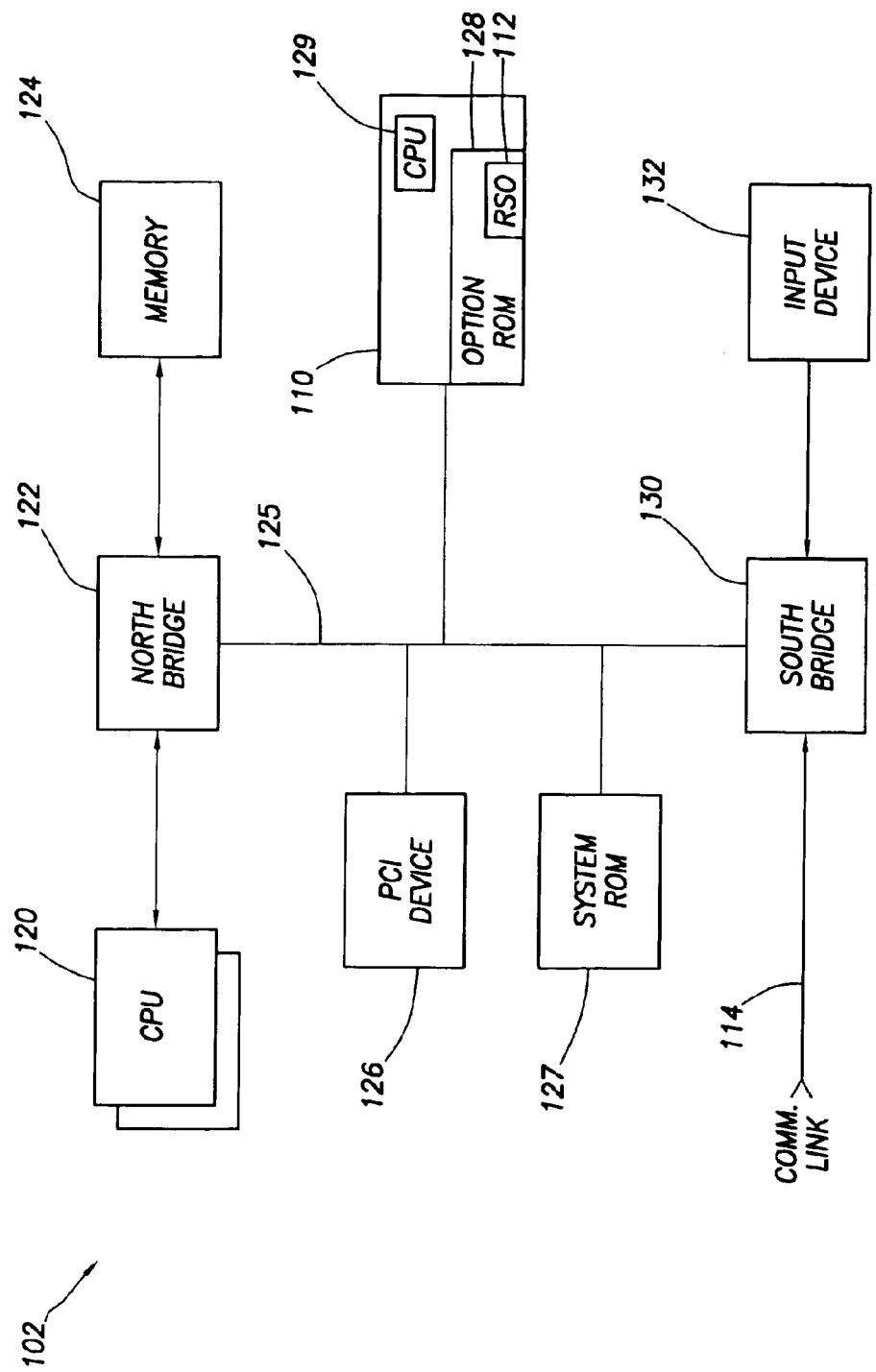
FIG. 3 shows a more detailed block diagram of a server in accordance with the preferred embodiment of the invention.

Referring now to FIG. 2, a computer system 100 is shown comprising a pair of servers 102a and 102b coupled to a storage device 104, such as a disk array. Each server includes a mass storage device controller 110a, 110b, a system ROM 116a, 116b, and other components as would be known by those of ordinary skill in the art. Such other components are shown in FIG. 3. Referring briefly to FIG. 3, a server 102 preferably includes one or more CPUs 120, a north bridge 122, a system memory 124 (e.g., random access memory), a system ROM 127, a south bridge 130 and an input device 132 (e.g., a mouse, keyboard, etc.). The north bridge 122 couples together the CPU 120, system memory 124 and the south bridge 130. The connection 125 between the north and south bridge preferably comprises a bus such as a peripheral component interconnect ("PCI") bus. One or more PCI-compliant devices 126 can be connected to the PCI bus, such as network interface card ("NIC"), modem, remote management card, and the like. The server's system ROM 127 also may connect to the server via the PCI bus 125.

The mass storage device controller 110 preferably also couples the PCI bus 125, but alternatively can connect into the server 102 in accordance with the different architectures. As shown, the mass storage device controller 110 includes its own option ROM 128 which contains code that can be executed by a CPU 120 included as part of the controller. In accordance with the preferred embodiment of the invention, the option ROM code also includes code 112 that supports redundant server option ("RSO") functionality. Referring back to FIG. 2, the option ROM RSO code is shown as code 112a and 112b in the option ROMs 128a and 128b.

Referring still to FIG. 2, the system 100 also includes an asynchronous communication link 114 that interconnects the two servers. This link, as described above, is used by the server designated as the "primary" server to transmit a periodic heartbeat signal or message to the server designated as the "slave." In this context, the primary server performs most or all of the run-time transactions, while the slave server remains available to take over should the primary fail. The heartbeat protocol on the communication link 114 can be any desired protocol, now known or later developed.

Either server 102a, 102b can be designated the primary, with the other server becoming the slave. Preferably, the configuration information as to whether a server is a primary or a slave is stored in non-volatile memory (not specifically shown) in the server. When a server 102a, 102b powers up, the configuration information is checked during POST to determine whether that server is to function as a primary or as a slave. If the server is to function as a slave, the normal boot process is altered to prevent the slave server from completing the boot process. Instead, the slave server simply waits for the primary server to fail by polling the communication link 114 for heartbeats from the primary server.

At least several different ways are possible to alter the normal boot process for a slave server to perform the functions explained above. In one embodiment, the option ROM 112 on the slave server is executed. The option ROM code, embedded with the RSO support code 112, may, if desired, test the storage array 56 and/or check out various aspects of the mass storage device controller 110 and then periodically polls the communication link 114 for heartbeats from the primary server and await a missing heartbeat. Alternatively, the heartbeats may be configured to cause an interrupt in the slave server. By polling the communication link 114, the option ROM code 112 does not release processor control back to the main system ROM 116 to complete the boot process. Once, however, the slave server fails to receive a heartbeat signal from the primary server when a heartbeat should have been received, the slave server's RSO support code 112 then releases control back to the system ROM 116. The system ROM code then completes the boot process, thereby permitting the slave server to function as a primary server.

Another other technique for interrupting the normal boot sequence of the slave server is to "hook" an appropriate interrupt vector to cause the boot sequence to stall. For example, as is well known by those of ordinary skill in the art, INT 19 includes a vector which is a pointer executable boot code. The INT 19 vector is normally written into main system memory 124 during POST. During a conventional boot process, the TNT 19 vector is accessed and the boot code is executed starting at the memory location identified by the vector. In accordance with a preferred embodiment of the invention, however, the RSO support code 112 saves the INT 19 vector in an alternate location (e.g., memory on the mass storage device controller 110) and rewrites the INT 19 vector with an alternate value. That alternate value points to code that causes the slave server to stall polling the communication port 114 for heartbeats from the primary server. Then, if and when a heartbeat fails to be received, the slave server writes the original INT 19 vector back to its original place in memory 124 and then causes control to perform an INT 19 to complete the boot process.

The preferred embodiments described herein are directed to a redundant computer configuration in which a slave computer performs part of its initialization process, but does not complete the boot process. Instead, the slave computer waits for the primary computer to fail, and if and when that happens, then completes the boot sequence. The code necessary for the slave to stall during the initialization process, wait for the primary to fail, and then complete the boot sequence preferably is not included within the slave's system ROM code. Instead, the code is included within a component or subsystem that is unique to a storage device or array shared by the slave and primary computers. In one embodiment, for example, such code is included in the mass storage device controller, which is the computer's interface to the shared storage device.

In this way, one or more of the following benefits are achieved:

The system ROM need not be upgraded every time a new mass storage device controller is made available on the market thereby saving development time and cost;

Because the system ROM does not change even with new controllers, the operator of the computer equipment does not have to re-flash the system ROMs thereby saving the operator time and money;

By incorporating the RSO support code in the mass storage device controller itself, an operator of server equipment can use mass storage device controllers that include the RSO support code in computers that were not initially designed to provide such a capability.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
a pair of computers; and
a storage device coupled to said computers;
wherein each computer includes an interface controller to said storage device, said interface controller includes executable code that causes at least one of said computers to determine whether it should stall during initialization and wait for the other of said computers to fail or complete the boot process;
wherein said executable code causes said boot process to stall by saving a first value from an interrupt vector used to identify boot code, and replacing said first value with a second value that identifies code that precludes said computer from completing the boot process.

2. The computer system of claim 1 wherein said executable code is contained in an option ROM included within said interface controller.

3. The computer system of claim 1 further including an interface link between said computers over which one computer provides heartbeats to the other computer and said executable code in the computer receiving the heartbeats causes the heartbeat receiving computer to monitor the interface link to determine whether the heartbeat sending computer is operational.

4. The computer system of claim 1 wherein, upon determining that the heartbeat sending computer has failed, the heartbeat receiving computer completes its boot process.

5. The computer system of claim 1 wherein said code that precludes said computer from completing the boot process determines whether the other computer has failed, and if the other computer has failed causes the boot process to complete.

6. The computer system of claim 5 wherein said boot process is caused to complete by writing the first value back to said interrupt vector and executing the code identified by said first value.

7. The computer system of claim 1 wherein said computers comprises servers.

8. A server, comprising:
a CPU; and
a peripheral device adapter coupled to said CPU, said peripheral device adapter including a ROM on which executable code is stored, said executable code permitting said server to determine whether a device external to said server has failed, and if said external device has failed, causes said server to take over the functionality of the failed device;
wherein, upon initialization, said executable code causes the boot process of said server to stall by saving a first value from an interrupt vector used to identify boot code, and replacing said first value in said interrupt vector with a second value that identifies code that precludes said server from completing the boot process.

9. The server of claim 8 further including an interface link input from said external device over which said external device provides heartbeats to said server and said executable code causes said server to monitor the interface link input to determine whether the external device is operational.

10. The server of claim 8 wherein, upon determining that external device has failed, said server completes its boot process.

11. The server of claim 8 wherein said executable code determines whether the external device has failed, and if the external device has failed causes the boot process to complete.

12. The server of claim 11 wherein said boot process is caused to complete by said executable code writing the first value back to said interrupt vector and executing the code identified by said first value.

13. The server of claim 8 wherein said external device comprises a server.

14. A server, comprising:
a CPU; and
a means for hooking an interrupt vector to prevent the server's boot process from completing, for determining whether a device external to said server has failed, and if said external device has failed, for causing said server to complete the boot process.

15. The server of claim 14 wherein said external device comprises a server.

16. The server of claim 14 further including, upon determining said external device has failed, a means for restoring said interrupt vector to permit said boot process to complete.

* * * * *